Patented Jan. 15, 1946

2,392,864

UNITED STATES PATENT OFFICE 2,392,864

DERIVATIVES OF THE DIALKYL ETHANE- AND DI-ETHYL ETHENE SERIES AND PROCESS OF MAKING THE SAME

Walter Schoeller, Berlin-Charlottenburg, Hans Herloff Inhoffen, Berlin-Wilmersdorf, Konrad Steinruck, Berlin-Tegel, and Otto Höss, Berlin N. 65, Germany, assignors to Schering Corporation, Bloomfield, N. J., a corporation of New Jersey No Drawing. Application February 8, 1940, Serial No. 317,976. In Germany February 3, 1939

2 Claims. (Cl. 260—586)

This invention relates to diphenyl ethane and ethene compounds and more particularly to hydrogenated compounds of this series, and a method of making the same. According to this invention new compounds are obtained having the biological properties of sex hormones from compounds of the diphenyl-ethane series of the general formula

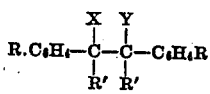

wherein R represents a member of the group consisting of the hydroxy group and groups convertible into the hydroxy group; R' represents a member of the group consisting of saturated or unsaturated alkyl groups; X and Y represent a member of the group consisting of hydrogen, halogen, the hydroxy group or a group convertible into a hydroxy group, wherein both symbols may have the same or different meaning, or both together may indicate a double bond between the ethane carbon atoms.

The main object of the present invention consists in the transformation of one or both aromatic nuclei of the starting materials to more or less hydrogenated nuclei, and if desired in the transformation of the hydroxy groups or the groups convertible into such groups to keto groups and the hydrogenation of double bonds, which may be present in the radicals R' or between the ethane carbon atoms at once or afterwards. Thereby starting compounds which, as is known, possess generally oestrogenic activity, are converted into products of androgenic character. By the process of the invention, compounds of the following formulae may be produced:

(I) 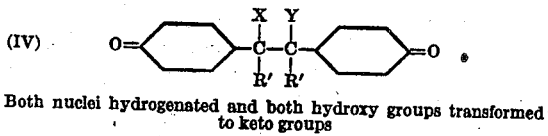

STARTING MATERIAL (II) 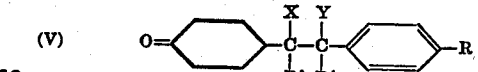

Both nuclei hydrogenated (III) 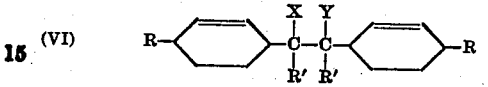

One nucleus hydrogenated (IV) 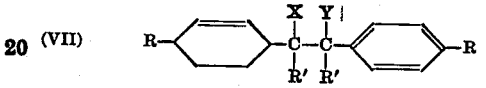

Both nuclei hydrogenated and both hydroxy groups transformed to keto groups (V) 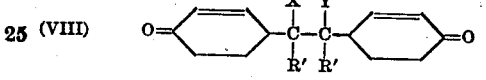

One nucleus hydrogenated and one hydroxy group transformed to a keto group (VI) 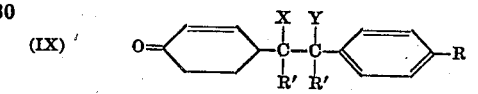

Both nuclei partially hydrogenated (VII) 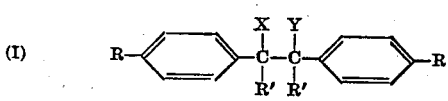

One nucleus partially hydrogenated (VIII) 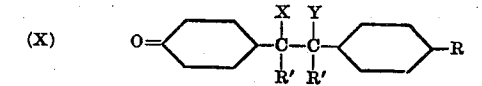

Both nuclei partially hydrogenated and both hydroxy groups transformed to keto groups (IX) 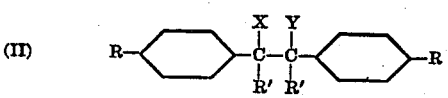

One nucleus partially hydrogenated and one hydroxy group transformed to a keto group (X) 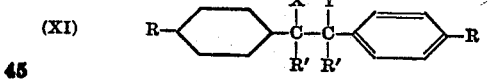

Both nuclei hydrogenated, one hydroxy group transformed to a keto group (XI) 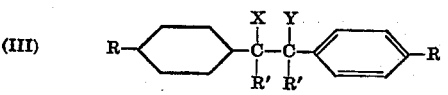

One nucleus hydrogenated (XII) 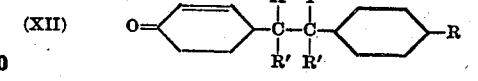

One nucleus partially, the other completely hydrogenated, one hydroxy group transformed to a keto group According to the invention one obtains, for instance, the cyclohexanol compounds of the formulae II and III by hydrogenating the starting materials. From these compounds result by oxidation the corresponding cyclohexanone compounds of the formulae IV, V, and X which may be transformed, for instance, by halogenation, splitting off halogen hydride and, if desired, reduction to partially hydrogenated compounds of the formulae VI–IX and XII. The production of dicyclohexanonyl ethane compounds may be illustrated e. g. by the following scheme:

(A) 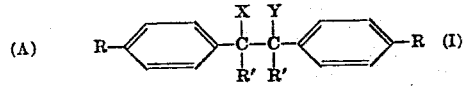 (I)

Hydrogenation (B) 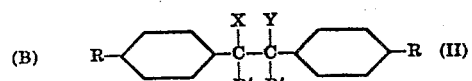 (II)

Oxidation (C) 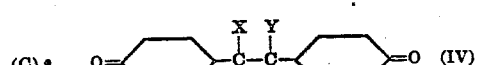 (IV)

Halogenation (D) 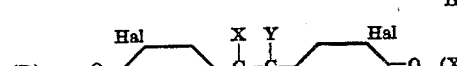 (XIII)

Splitting off halogen hydride (E) 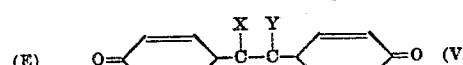 (VIII)

Reduction (F) 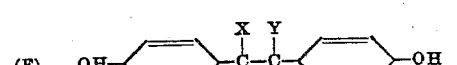 (VI)

In order to produce compounds in which only one nucleus of the starting material is hydrogenated one proceeds advantageously in such a manner that compounds in which X represents a member of the group consisting of the hydroxy group and a group convertible thereinto while Y indicates hydrogen are used as starting material, which are then hydrogenated, oxidized, halogenated and dehalogenated by splitting off halogen hydride thereby forming double bonds, and whereby, if desired, at the same time or subsequently X is split off together with the neighbouring hydrogen atom Y, so as to form a double bond, thus aromatizing the cyclohexan nucleus by rearrangement according to the following scheme:

(A) 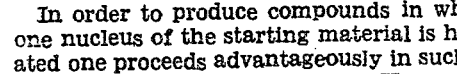 (I)

Hydrogenation (B) 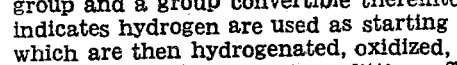 (II)

Oxidation (C) 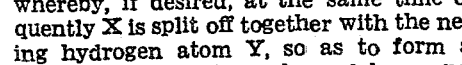 (IV)

Halogenation (D) 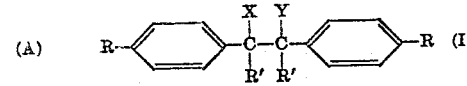 (XIII)

Splitting off halogen hydride (E) 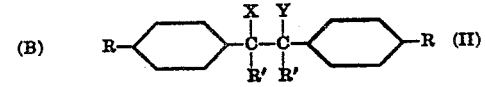 (VIII)

Reduction (F) 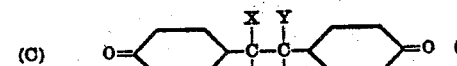 (VI)

Splitting off X and Y under formation of a double bond and oxidation (G) 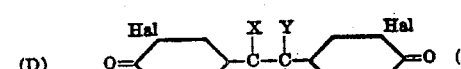 (XIV)

Rearrangement and (H) ( O= ... =O (XV) )

Aromatisation (I) O= ... —OH (IX)

Reduction (K) HO— ... —OH (VII)

Of course, it is also possible to proceed in such a manner that compounds are employed as starting material in which only one hydroxy group is substituted by a group reconvertible to a hydroxy group while the other hydroxy group is left free. On oxidizing such compounds in which one hydroxy group is protected against the action of the oxidizing agent or by partial oxidation of the dialcohols keto alcohols are obtained which by halogenation and dehalogenation may be transformed to ketoalcohols with one double bond. If in such compounds the ethane chain contains a double bond or if such double bond is formed by splitting off X and Y as described above, by rearrangement phenol-alcohols can be produced. These reactions are illustrated by the following scheme:

(A) HO— ... —R (I)

Hydrogenation (B) HO— ... —R (II)

Oxidation (C) O= ... —R (X)

Halogenation (D) O= ... —R (XVI)

Splitting off halogen hydride (E) O= ... —R (XII)

Splitting off X and Y thus forming a double bond

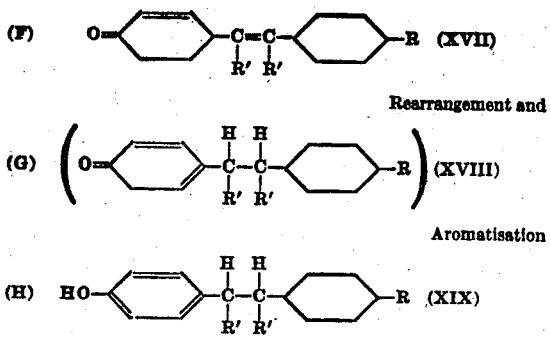

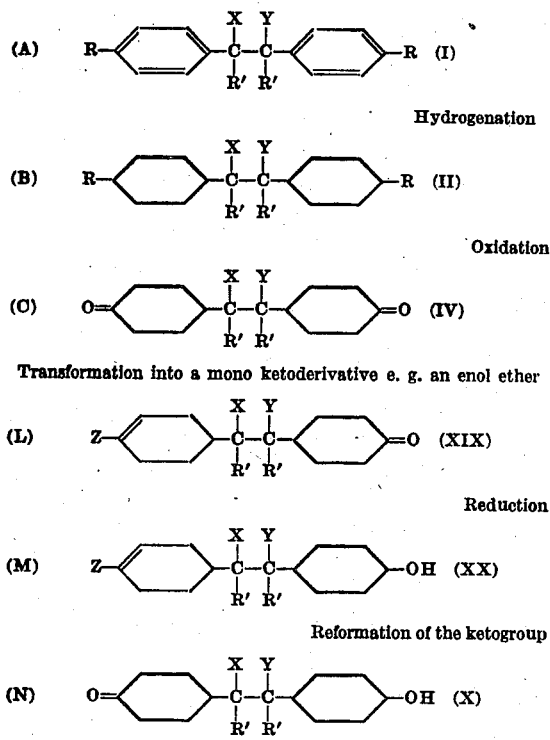

Compounds of the formula X, that is, ketoalcohols may also be obtained by starting from the corresponding diketones, transforming one ketogroup into a keto- or enol derivative such as a semicarbazone, acetal or an enol ether or the like in known manner, then hydrogenating the one nucleus to a saturated cyclohexanol residue and finally restoring the ketogroup according to the following scheme:

As starting materials preferably such dialkyl-dihydroxy-diphenyl-ethane or -ethene derivatives are employed, whose alkyl radicals contain a number of carbon atoms up to 5, particularly di-(hydroxyphenyl)-diethyl-ethane or ethene or the esters of said compounds. The hydroxy groups may also be replaced by other groups reconvertible to a hydroxy group such as halogen, glucoside, ether groups and so on, which may be replaced, if necessary, before, in the course, or after the reaction by hydroxy groups in known manner. The hydroxy groups of the starting materials may also be substituted by different radicals, for instance, one hydroxy group by an acetyl, the other by a propionyl radical, and the like.

Also mono derivatives of the dialkyl-diphenyl-ethane or ethene series may be employed as starting materials. Using such starting materials, in which X and Y mean a double bond or in which R' represents unsaturated alkyl radicals, these double bonds, of course, are saturated on hydrogenation.

As starting materials also such compounds may be used in which X and Y represent hydroxy groups or groups convertible to hydroxy groups, preferably halogen, or combinations of such groups with hydrogen. Such compounds are described, for instance, in U. S. application Serial No. 309,616, filed December 16, 1939.

The hydrogenation of the starting materials is performed in a manner known per se, for instance, in a solution of glacial acetic acid by means of hydrogen in the presence of a platinum catalyst or of another suitable hydrogenation catalyst. Hydrogenation may be performed with catalytically activated hydrogen, whereby as catalysts may be used noble or other metal catalysts, as well as hydrogen in statu nascendi.

As catalysts are suitable, for instance, nickel catalysts, palladium, platinum or the like which may be placed on a carrier. For hydrogenation by means of hydrogen in statu nascendi coppered zinc dust in an alcoholic medium may be employed.

Methods for the hydrogenation are described, for instance, in "Houben-Weyl: Methoden der organischen Chemie," 3rd edition (1925), vol. 2, page 312 ff., especially page 326 ff.

The oxidation of the hydroxy groups in the hydrogenated products to keto groups is also performed by methods known per se, preferably, especially in case that double bonds present in the molecule are not to be intermediately saturated to protect them, according to the method of exchange of oxidation stages (see Meerwein and Schmidt, Liebigs Annalen, vol. 444, page 221 and Ponndorf, Zeitschrift für angew. Chemie, vol. 29, page 138) as described in the U. S. application Serial No. 145,824, for compounds of the steroid series, by means of aldehydes or ketones in the presence of metal alcoholates, as aluminium isopropylate or magnesium chloroethylate or others. Other methods suitable for oxidation are described, for instance, in Houben-Weyl, "Methoden der organischen Chemie," 3rd edition, vol. 2, page 22 ff. (1925) especially page 47/48.

Halogenation is performed by known methods preferably with bromine in an organic solvent by dissolving the ketonic intermediate products in an organic solvent as for example ether, chloroform, glacial acetic acid, benzene, acetic acid anhydride and so on, and then adding the calculated amount of halogen, like bromine, chlorine, chlorine-iodine in a liquid state or in the form of vapour or dissolved in an organic solvent such as those mentioned above, to the solution. According to the reactivity of the ketone employed halogenation can be performed with heating or cooling. The amount of halogen necessary for the reaction may be added at once or dropwise while stirring. The reaction may further be carried out in the presence of a catalyst, for instance of halogen hydride, iodine and so on, or in the presence of a material capable of combining with acids, such as potassium acetate, calcium carbonate, and/or while exposing the mixture to the rays of ordinary, ultraviolet or infrared light. Of especial value has proved a process in which the substance is dissolved in chloroform and after addition of a concentrated solution of bromohydride in glacial acetic acid the corresponding amount of a bromine solution in glacial acetic acid is allowed to run into the solution.

Such methods for halogenation are described, e. g., in Houben-Weyl, "Methoden der organischen Chemie," 3rd edition, vol. 2, (1925), page 533 ff.

For dehalogenation one may use ammonium or with a better effect organic bases; especially suitable are for this purpose pyridine, piperidine and collidine, but also with other bases the reaction may be carried out, for instance, with quinoline, aliphatic or aromatic amines as dimethylamine, diphenylamine, dimethyl-aniline and others. The treatment with these bases, which are suitably employed in anhydrous condition, if necessary in the presence of a suitable solvent, is performed in such a manner than the halogenated ketones are heated or boiled under reflux with the bases. By addition of substances capable of binding the halogen hydride formed in this reaction without reacting with the starting material, for instance, by addition of calcium carbonate and the like the isomerizing and resinifying effect of the halogen hydride is retarded or suppressed. Such methods of splitting off halogen hydride are also described in Houben-Weyl "Methoden der organischen Chemie," 3rd edition, (1925), vol. 2, page 549 ff.

Compounds of the formulae XIV and XVII, i. e. compounds containing a double bond in the ethane chain besides one or more double bonds in the nuclei may be transformed into partially aromatic compounds of the formulae VII, IX and XI by treatment with agents causing a so called allyl rearrangement.

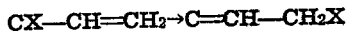

Such agents are known to those skilled in the art, and are, for instance, acetic acid and its derivatives, such as acetic acid anhydride, halogen acetic acids, as chloro- and trichloro acetic acid, inorganic acids like halogen hydrides, halogenides of phosphorus and the like, as they are described, for instance, in "Comptes rendus," (1927) vol. 185, page 1283 ff and in W. Hückel's textbook on "Theoretische Grundlagen der organischen Chemie," 2nd edition (1934), vol. 1, page 228 ff.

Means capable of splitting off water such as concentrated sulfuric acid and the like are described, for instance, in Houben-Weyl, "Methoden der organischen Chemie," 2nd edition, (1922), vol. 2, page 744 ff.

The following examples illustrate the invention, without, however, limiting the same to them.

EXAMPLE 1

A solution of 10 gs. of diethyl-di-(hydroxyphenyl)-ethene in 200 ccs. of glacial acetic acid is shaken with hydrogen in the presence of a platinum oxide catalyst until 7 mols of hydrogen are taken up. The catalyst is removed by filtration and the residue obtained by evaporating the glacial acetic acid in vacuo is boiled under reflux with 200 ccs. of a 5% solution of potassium hydroxide in alcohol. Then the mixture is diluted with water, acidified and extracted with ether. The diethyl-di-(cyclohexanolyl)-ethane is obtained in the form of a clear oil which may be used for the further treatment without purification. Yield 9 gs.

9 gs. of this compound are dissolved in 100 ccs. of glacial acetic acid. This solution is mixed with a solution of chromic acid in acetic acid, containing 2.5 atoms of active oxygen. After standing for 24 hours at room temperature the mixture is poured into water and extracted with ether, the ethereal extract is washed till neutral and evaporated to dryness, whereby the diethyl-di-(cyclohexanonyl)-ethane is obtained as a clear oil. Yield 7 gs.

Without further purification this diketone is redissolved in 15 ccs. of glacial acetic acid and a solution of 2.1 mols of bromine in 50 ccs. of glacial acetic acid is added drop by drop under stirring after addition of a few drops of a bromine hydride solution in glacial acetic acid. Stirring is continued until the colour of bromine has disappeared. Then water is added and the mixture is extracted with ether. From the ethereal solution the dibromide is isolated. It is dissolved in 200 ccs. of anhydrous pyridine and this solution is boiled for 6 hours under reflux. After evaporation of the pyridine in vacuo the residue is treated with water and ether. The separated ethereal solution is washed, dried and evaporated to dryness. The dark oil obtained is distilled for purification in a high vacuum after addition of a small amount of sodium acetate. The distillate is subjected to a further purification by means of the chromatographic absorption method whereby the diethyl-di-(cyclohexenonyl)-ethane is obtained as a clear oil. Yield 230 mgs. When tested in the capon comb test by injection of a single dose it shows an androgenic activity of 1 capon unit (CU) in about 1 mg. of the substance.

EXAMPLE 2

A suspension of 15 gs. of di-(p-hydroxyphenyl)-diethyl-ethane in 500 ccs. of glacial acetic acid is shaken with hydrogen in the presence of 3.7 gs. of platinum oxide for 3 days at 20° C. Thereby the calculated volume of hydrogen is absorbed. The glacial acetic acid is then removed by distillation in vacuo and the residue is boiled for 4 hours with 100 ccs. of a 20% solution of potassium hydroxide in methanol under reflux for saponification of the acetate which may have been formed. Then the mixture is diluted with water and the methanol is evaporated as completely as possible. On thoroughly extracting the alkaline solution with ether the di-(p-cyclohexanolyl)-diethyl-ethane is obtained as a viscous oil in a yield of 10 gs. After acidifying the alkaline solution 4 gs. of starting material are recovered.

10 gs. of di-(p-cyclohexanolyl)-diethyl-ethane are dissolved in 130 ccm. of glacial acetic acid. At 10° C. a solution of 5 gs. of chromic acid anhydride in 10 ccs. of water and 100 ccs. of glacial acetic acid are added drop by drop with rigorous stirring. The mixture is allowed to stand over night at room temperature. Then it is diluted with a large quantity of water and 3 times extracted with ether. The ethereal solution is washed several times with a 5% solution of sodium bicarbonate until neutral. After evaporation of the ether a dark coloured oil of a characteristic odour is obtained in a yield of 7.2 gs. This product is distilled in a high vacuum whereby 2 fractions are obtained:

1st fraction: Boiling point 90–105° C. at 0.001 mm. 5.2 gs. of a colourless oil.

2nd fraction: Boiling point 120° C. at 0.001 mm. 0.5 gs. of a colourless oil.

After standing for a longer period of time most of the 2nd fraction crystallizes. After recrystallisation from an ether-petrolether-mixture colourless prisms of a melting point of 86–87° C. are obtained. The analysis shows that this product is a diketone of the formula $C_{18}H_{30}O_2$. 180 mgs. of this diketone yield with 0.4 gs. of 2,4-dinitrophenylhydrazene 340 mgs. of a dihydrazone crystallizing from hot anisol forming small yellow rod-like crystals of a melting point of 249° C. with decomposition. It is of a very low solubility in the usual organic solvents in the cold as well as in the heat. The analysis shows the constitution of a dihydrazone.

To a solution of 4.9 gs. of the 1st fraction in 100 ccs. of chloroform a solution of 1.75 ccs. of bromine in 50 ccs. of chloroform is added drop by drop at 0° C. while stirring. After a short time bromination begins with development of bromine hydride which continues until the bromine is consumed. Then the chloroform is evaporated in vacuo at 30° C. and the remainder is refluxed with 100 ccs. of dry pyridine for 6 hours at a bath temperature of 130° C. Then the pyridine is removed in vacuo and the residue taken up in ether and water. The etheral solution is washed several times with diluted sulfuric acid and then with a solution of sodium bicarbonate and with water until neutral. After evaporation of the ether there remains a dark coloured oil which is distilled in a high vacuum. Under 0.001 mm. pressure it distils between 85–95° C. in a yield of 1.78 gs. The colourless oil so obtained is active in the capon comb test.

EXAMPLE 3

23 gs. of the oily isomeric di-(p-oxyphenyl)-diethyl-ethene are shaken in a solution in 300 ccm. of glacial acetic acid with hydrogen in the presence of 5 gs. of platinum oxide at room temperature for 3 days. Somewhat more than the calculated volume of hydrogen is absorbed. When worked up as described above 18.6 gs. of the hydrogenation product and 2 gs. of the starting material are recovered.

To a solution of these 18.6 gs. in 200 ccs. of glacial acetic acid are added 9.5 gs. of chromic acid anhydride in 10 ccs. of water and 100 ccs. of glacial acetic acid at 10° C. The mixture remains for 18 hours at room temperature. If it is worked up according to the above description, 14 gs. of a honey-like smelling oil are obtained, distilling in a high vacuum as a pale yellow oil at 95–120° C. in a yield of 7.27 gs.

To a solution of 7.27 gs. of this oil in 125 ccs. of chloroform a solution of 2.55 ccs. of bromine in 50 ccm. of chloroform is dropped in at 0° C. whilst vigorously stirring. The bromine is rapidly consumed. The chloroform is removed in vacuo and the remainder is boiled with 100 ccs. of dry pyridine for 6 hours under reflux.

Worked up according to Example 2 a dark coloured oil is obtained distilling in a high vacuum between 80° and 100° C. under 0.001 mm. pressure in a yield of 3.9 gs. The colourless oil thus obtained is active in the capon comb test.

EXAMPLE 4

14 gs. of di-(p-acetoxyphenyl)-diethyl-ethane are hydrogenated in 100 ccs. of cyclohexane in the presence of 15 gs. of a nickel catalyst according to Raney, stored under cyclohexane, for 6 hours at 200° C. and an initial pressure of 130 atm.

On cooling from the cyclohexane solution some colourless crystals separate, which on recrystallisation from hot methanol form small rodlike crystals joined to stars of a melting point of 166–168° C. According to the analysis they have the formula $C_{18}H_{34}O_2$ of di-(p-oxycyclohexanyl)-diethyl-ethane.

The cyclohexane solution is filtered. Crystals settling down are dissolved by hot methanol. The joint cyclohexane and methanol solutions are evaporated to dryness in vacuo and the remainder is saponified by boiling for 3 hours with 75 ccs. of a 20% solution of potassium hydroxide in methanol. Then the mixture is diluted with water and extracted with ether. This ether contains 9.2 gs. of an oily hydration product. The alkaline solution is acidified to Congo acid reaction and reextracted with ether. This ethereal solution contains only a very small quantity of starting material.

The solution of 1.75 gs. of the hydrogenation product in 40 ccm. of dry pyridine is added with 5 gs. of 3,5-dinitro-benzoyl-chloride. After standing for 1 day the mixture is worked up in the customary manner. 3.7 gs. of an oily di-dinitrobenzoate are obtained. This product is dissolved in acetone and treated with methanol. By standing over night the di-dinitrobenzoate crystalizes in the form of fine needles in a yield of 0.5 gs. and a melting point of 202° C. According to the analysis this substance has the composition of $C_{32}H_{38}O_{12}N_4$.

7.35 gs. of the hydrogenation product so obtained are dissolved in 100 ccs. of glacial acetic acid. Under vigorous stirring there is dropped into this solution a solution of 3 gs. of chromic acid anhydride in 1.5 ccs. of water and 100 ccs. of glacial acetic acid while cooling to about 10° C. The mixture remains in an ice box over night. Then it is diluted with a large quantity of water and 3 times shaken out with ether. The ethereal solution is washed with a 5% solution of sodium bicarbonate to neutrality. After evaporation of the ether 5.8 gs. of a colourless oily oxidation product is obtained which on standing over night crystallises partially. After addition of petrol ether the crystals are separated by suction, then they are washed with petrol ether, in which the crystals are absolutely insoluble while the oily oxidation product is easily soluble therein. The melting point of the crystals is about 82–84° C. Recrystallized from a mixture of ether and petrol ether they form colourless prisms of a melting point of 84–86° C. This substance forms with 2,4-dinitro-phenyl-hydrazene at once a yelloy hydrazone. The yield of pure crystals amounts to 710 mgs.

To a solution of 0.5 gs. of this diketone in 15 ccs. of chloroform a bromine solution in chloroform is added drop by drop at 0° C. until the quantity of bromine calculated for 2 mols is absorbed. The chloroform is evaporated in vacuo at 20–30° C. The residue of 0.8 gs. is divided into 2 equal parts for the following experiments of splitting off bromide hydride.

(A) SPLITTING OFF BROMINE HYDRIDE WITH COLLIDINE 0.4 gs. of the dibromketone are boiled with 5 ccs. of dry collidine for half an hour under reflux. Then the solution coloured somewhat dark is diluted with ether and washed several times with diluted sulfuric acid and then with a solution of sodium bicarbonate and water until it is neutral. After evaporation of the dried ethereal solution a dark coloured oil remains in a yield of 150 mgs. This is fractionated by distillation in a high vacuum forming 2 fractions:

*1st.*—A colourless oil distilling at 125° C. under 0.0005 mm. pressure active in the capon comb test.

*2nd.*—A colourless oil distilling at 150° C. under 0.0005 mm. pressure active in the capon comb test.

(B) Splitting Off Bromine Hydride With Pyridine 0.4 gs. of the dibromketone are refluxed with 5 ccs. of dry pyridine for 6 hours. When worked up as mentioned under (A) a dark coloured oil is obtained active in the capon comb test.

EXAMPLE 5

10 gs. of di-(p-oxyphenyl)-diethyl-ethane in 100 ccs. cyclohexane are treated with hydrogen in the presence of 5 gs. of a nickel catalyst according to Raney for 5 hours at 210–215° C. under an initial pressure of 140 atms. under vigorous stirring. Then the catalyst is removed by filtration and extracted several times with hot methanol. The joint cyclohexane and methanol solutions are freed from the solvent in vacuo and the residue is triturated with 200 ccs. of ether. Thereby the product of hydrogenation difficultly soluble in ether separates in a yield of 4 gs., showing the composition of the formula $C_{18}H_{34}O_2$ and a melting point of 160–165° C. After recrystallisation from methanol the melting point rises to 166° C. If the ethereal solution stands for a longer time an epimere product of hydrogenation of the same formula separates having a melting point of 112–120° C. Yield 3.15 gs. It is recrystallised from aqueous methanol or from benzene, forming then small colourless staffs. After recrystallisation for 3 times the melting point is constant at 117–120° C. In contrast to the epimeric product of the melting point of 166° C. it is easily soluble in methanol and also in ether.

I. Oxidation of the Substance Melting at 166° C.

A solution of 2 gs. of said substance in 100 ccs. of glacial acetic acid is treated drop by drop with a solution of chromic acid anhydride (calculated 955 mgs.) in 10 ccs. of water and 100 ccs. of glacial acetic acid at 10° C. The mixture remains over night in an ice box at 5° C. Then it is worked up according to Example 4, yielding a colourless oil, which crystallises after a short time for the most part. On recrystallising from an ether-petrolether-mixture the diketone is obtained in a yield of 1.1 gs. On repeating the recrystallisation the melting point is 86° C. Yield of pure diketone 0.87 gs.

II. Oxidation of the Substance of the Melting Point 120° C.

A solution of 2.75 gs. of said substance in 100 ccs. of glacial acetic acid is treated drop by drop with a solution of 1.35 gs. of chromic acid anhydride in 10 ccs. of water and 100 ccs. of glacial acetic acid at 10° C. and left at 5° C. over night. On working up according to Example 4 a colourless oil is obtained in a yield of 2.3 gs. From an ether-petrolether-mixture the solidified oil crystallises in the form of colourless prisms of a melting point of 85° C. Yield 1.3 gs.

The diketones obtained from both substances I and II are identical according to their melting point and the melting point of their mixture.

III. Bromination and Debromination of the Diketone of M. P. 86° C.

(A).—In chloroformic solution

A solution of 2 gs. of the diketone in 50 ccs. of chloroform is treated with a solution of 0.77 ccs. of bromine in 50 ccs. of chloroform at —5 to —10° C. whilst vigorously stirring in the course of 2½ hours. After washing the mixture with water and evaporation of the chloroform a sticky somewhat yellow coloured oil is obtained, which does not crystallise, in a yield of 3.63 gs.

From this substance the splitting off of bromine hydride is performed by heating on the water bath with 15 ccs. of collidine for 4 hours. The product so obtained contains still halogen and forms a non-crystallising oil.

This oil is heated with a fresh quantity of collidine to 130° C. for ½ hour and yields 1.63 gs. of a non-crystallising still halogen-containing oil, which shows in the capon's test an androgenic activity of 2 mgs./C. U.

(B).—In glacial acetic acid solution

The solution of 2 gs. of the diketone in 100 ccs. of glacial acetic acid is treated at 10° C. with a solution of 0.77 ccs. of bromine in 50 ccs. of glacial acetic acid in the course of 2 hours whilst vigorously stirring. On adding water to this mixture the products of bromination separate as a colourless oil. This mixture is extracted with ether and the ethereal solution washed with water to neutrality. On evaporation of the ether the oily brominated product remains in a yield of 3.5 gs.

Splitting off bromine hydride is performed with pyridine or collidine as described above. Thereby substances are obtained active in the capon's comb test with about 1.5 mgs./C. U.

EXAMPLE 6

On reacting anethole hydrobromide with sodium, as a by-product an oily isomeric di-(p-methoxyphenyl)-diethylethane is obtained. This oil yields after splitting off the methoxyl groups a syrupy at first non-crystallising oil, which crystallises partially in the course of 4–5 weeks. On treating with benzene dark coloured non-crystallising ointments are easily dissolved. Thus from 564 gs. of this oil 180 gs. of crystals are obtained. From the benzenic solutions on standing further 30 gs. of crystals are recovered. On recrystallisation from benzene it forms colourless prisms melting at 127–128° C. The melting point of this substance when mixed with di-(p-oxyphenyl)-diethyl-ethane of M. P. 184° C. shows a significant depression to 115–117° C.

10 gs. of the isomeric di-(p-oxyphenyl)-diethylethane of M. P. 128° C. dissolved in 100 ccs. of cyclohexane are hydrogenated at 175–185° C. and 130 atms. initial pressure in the presence of 5 gs. of a nickel catalyst according to Raney stored under cyclohexane for 2 hours. The absorption of hydrogen begins at 160° C. The catalyst is removed by filtration and washed several times with hot methanol. From the joint cyclohexane and methanol solutions the solvents are removed in vacuo. The residue is treated with ether, whereby the product of hydrogenation, difficultly soluble in ether, separates in a yield of 4.67 gs., having the formula $C_{18}H_{34}O_2$. On recrystallisation from dioxane, prisms of a M. P. of 187–188° C. are obtained. This substance is isomeric with the products of hydrogenation described in Example 5.

The solution of 2.61 gs. of this substance in 100 ccs. of glacial acetic acid is treated at 10° C. drop by drop with a solution of 1.3 gs. of chromic acid anhydride in 15 ccs. of water and 100 ccs. of glacial acetic acid. This mixture remains at 5° C. over night and is then worked up as usually. A colourless oil in a yield of 2.45 gs. is obtained.

From gasoline boiling between 70 and 80° C. it crystallizes forming colourless prisms of M. P. of 74–75° C. in a yield of 1.5 gs. According to the analysis said substance has the formula $C_{18}H_{30}O_2$.

The diketone of the M. P. 74° C. is isomeric with the diketone of M. P. 86° C. When the diketones are mixed the melting point of the mixture shows a remarkable depression.

To a solution of 1.4 gs. of the isomeric diketone of M. P. 74° C. in 100 ccs. of chloroform at −15° C. a solution of 0.58 ccs. of bromine in 100 ccs. of chloroform is added dropwise.

If the chloroformic solution is washed, dried and evaporated a noncrystallising oil in a yield of 2.2 gs. is obtained. The solution of 1.1 gs. of the brominated substance in 10 ccs. of dry pyridine is boiled under reflux for 6 hours. On working up a pale brown halogen containing oil is obtained, with an androgenic activity of 1 mg./C. U. in the capon's comb test.

EXAMPLE 7

140 gs. of the isomeric di-(p-oxyphenyl)-diethyl-ethane according to Example 6 of the M. P. 128° C. are hydrogenated according to the conditions of Example 6. After removing the solvents the residue is triturated with ether. Thereby the hydrogenation product difficulty soluble in ether separates, having a M. P. of 180–185° C. From the concentrated ethereal solution a second hydrogenation product separates showing a M. P. of 128–135° C. The total amount of hydrogenation products is 92.4 mgs. The product melting at 135° C. crystallises from benzene in the form of colourless crystals of M. P. 135° C. It shows the composition of $C_{18}H_{34}O_2$ and is an epimer of the first crystallising product of M. P. 187–188° C. and isomeric with the hydrogenation products of M. P. 166° C. and 117–120° C. obtained in Example 5.

A solution of 10 gs. of the hydrogenated product melting at 128–132° C. in 200 ccs. of glacial acetic acid is treated at 10° C. dropwise with a solution of 5 gs. of chromic acid anhydride, dissolved in 20 ccs. of water and 200 ccs. of glacial acetic acid. The mixture is allowed to stand over night at 5° C. and is then worked up as usually. The yield of a crystalline crude diketone amounts to 8.3 gs. which is recrystallized from a mixture of ether and petrolether and then shows a melting point of 74–75° C., having the formula $C_{18}H_{30}O_2$. These crystals form long broad staffs. The substance is isomeric with the diketone $C_{18}H_{30}O_2$ obtained according to Example 6.

Bromination and splitting off bromine hydride is performed as described in Example 6, whereby substances of androgenic activity are obtained which are identical with those obtained in Example 6.

EXAMPLE 8

In addition to the crystallized diketone of M. P. 86° C. on oxidation of 430 gs. of di-(p-cyclohexanolyl)-diethylethane with chromic acid anhydride according to Example 5 a sirupy faintly yellow oil is obtained in a yield of 90 gs. This oil represents a mixture of keto-alcohols, of diketones not totally crystallized and of a resin. On distillation in a high vacuum there are obtained as a 1st fraction a faintly yellow oil, boiling at 160–180° C. under 0.001 mm. pressure in a yield of 48.5 gs., and as a 2nd fraction a pale yellow oil boiling at 180–200° C. under 0.001 mm. pressure in a yield of 28.5 gs.

48.5 gs. of the oil of the 1st fraction are dissolved in 200 ccs. of ether, treated with 200 ccs. of petrolether and filtrated through a column of 600 gs. of aluminium oxide. The column is then washed out with 1 liter of each of the following solvents, and the solutions so obtained are filtered and freed from the solvent.

| Number of experiment | Solvent | Residue from the filtrate after evaporation of the solvent |
|---|---|---|
| I | Petrolether | 14 gs. of an oil giving with dinitro-phenyl-hydrazene a yellow hydrazone of M. P. 218–220° C. |
| II | Benzene | 7 gs. of an oil yielding 5 gs. of the diketone of M. P. 86° C. |
| III | Benzene | 5 gs. of the diketone of M. P. 86° C. |
| IV | Ether | 5.5 gs. of a mixture of diketone and keto-alcohol. |
| V | Acetone | 10 gs. of a soon crystallising oil. After recrystallisation from a mixture of ether-petrol ether 6.5 gs. of keto-alcohol. |
| VI | Methanol | 10 gs. of an oil, yielding 1 g. of the hydrogenation product of M. P. 166° C. The remaining oil yields a red hydrazone. |

The keto-alcohol from fraction V yields from a mixture of ether-petrolether broad long rodlike crystals of M. P. 73–74° C. of the formula $C_{18}H_{32}O_2$ and represents probably a mixture of the 2 possible epimeric forms. For oxidizing with chromic acid a mixture of the 2 epimeric hydrogenation products of M. P. 165° C. and 120° C. is employed. The substance represents the (p-cyclohexanonyl)-(p-cyclohexanolyl)-diethyl-ethane.

A solution of 2.5 gs. of this substance in 50 ccs. of acetic acid anhydride is boiled for 2 hours. The solvent is removed in vacuo and the residue dissolved in petrolether. The solution is filtered through a column of aluminium oxide. On concentration the petrolether solution yields 2 gs. of a crystallised product which on recrystallisation from gasoline or from petrolether yields colourless crystals of M. P. 69–73° C. and represents the (p-cyclohexanonyl)-(p-acetoxycyclohexanyl)-diethyl-ethane.

The solution of 1 g. of said keto-alcohol in 30 ccs. of chloroform is heated with a solution of 0.38 ccs. of bromine in 30 ccs. of chloroform in the course of 1 hour at −5° to −10° C. whilst stirring. After washing and evaporating the chloroform a pale yellow oil is obtained in a yield of 1.4 gs.

The solution of this brominated product in 15 ccs. of dry pyridine is boiled for 6 hours under reflux. After evaporation of the pyridine in vacuo the residue is dissolved in ether. The ethereal solution is washed with water. The ether then is evaporated and for further purification the remainder is distilled in a high vacuum, whereby at a temperature of 168–180° C. of the bath a mono unsaturated keto-alcohol is obtained as a yellow oil, representing the (p-cyclohexenonyl)-(p-cyclohexanolyl)-diethyl-ethane. This product is active in the capon's comb test with 1 mg./C. U. Yield 420 mgs.

EXAMPLE 9

On preparing the isomeric diketone of M. P. 74° C. according to Example 6 the ether-petrolether mother liquors are collected. After standing for a rather long time, 25.5 gs. of a mixture of crystals separate, which are purified by means of the absorption analysis. They are dissolved in 200 ccs. of ether and 200 ccs. of petrolether and the solution passed through a column of 350 gs. of aluminium oxide. Then the column is washed with 500 ccs. of each of the following solvents, the solutions are filtered and evaporated.

| Number of experiment | Solvent | Residue of the filtrate after evaporation of the solvent |
|---|---|---|
| I | Petrolether | 7.1 gs. of isomeric diketone mixed with some oil. |
| II | Benzene | 8.2 gs. of isomeric diketone mixed with some oil. |
| III | Ether | 3.2 gs. of oil. |
| IV | Acetone | 6.8 gs. of oil crystallising after standing for a rather long period of time. Keto-alcohol. |
| V | Methanol | 0.15 g. of the product of hydrogenation. |

The material obtained from fraction IV is recrystallized from cyclohexane or from a mixture of ether and petrolether. The isomeric keto-alcohol of the formula $C_{18}H_{32}O_2$ is recovered in the form of star-like needles melting at 102° C.

Bromination and splitting off bromine hydride is performed according to Example 8 whereby also an isomeric mono unsaturated keto-alcohol is obtained in analogous yield, isomeric to the unsaturated keto-alcohol described in Example 8.

EXAMPLE 10

A solution of 1 g. of the acetate of the keto-alcohol obtained according to Example 8 in 30 ccs. of chloroform is treated with a solution of 0.34 ccs. of bromine in 30 ccs. of chloroform at −5 to −10° C. with stirring in the course of 1 hour. After washing and evaporation of the chloroform a pale yellow oil is obtained in a yield of 1.35 gs. This oil is refluxed in 15 ccs. of dry pyridine for 6 hours, then the pyridine is distilled off. The residue is dissolved in ether and the ethereal solution washed with water. The product remaining after removing the ether by distillation is distilled in a high vacuum for further purification whereby at a bath temperature of 160–180° C. the (p-cyclohexenonyl)-(p-cyclohexanolylacetat)-diethyl-ethane distils as a clear oil in a yield of about 400 mgs.

EXAMPLE 11

The solution of 1 g. of the keto-alcohol melting at 73–74° C. in 30 ccs. of chloroform is treated with a solution of bromine in chloroform at a low temperature whilst vigorously stirring until the quantity of bromine calculated for 2 mols of bromine is taken up. One mol of bromine is absorbed very rapidly at −15° C., whilst the other remains unabsorbed at this temperature and is taken up after raising the temperature to 0° C. From the chloroformic solution washed with a solution of sodium bicarbonate and water to neutrality and dried over sodium sulfate the chloroform is distilled off in vacuo. A colourless non-crystallising oil remains in a yield of 1.5 gs.

0.75 gs. of this product is boiled in 5 ccs. of pyridine for 7 hours under reflux. After evaporation of the pyridine in vacuo the remainder is dissolved in ether. The ethereal solution is shaken several times with a 5% solution of potassium hydroxide. Then the ether is distilled off. A substance free of halogen remains in a yield of 60.3 mgs.

If the alkaline solution is acidified with diluted sulfuric acid a small amount of a white precipitate separates. It is dissolved in ether. After washing and drying the ethereal solution and removing the ether the phenolic parts of the debrominated product are obtained in a yield of 13.4 mgs.

What we claim is:

1. The oily diethyl-(p-cyclohexenonyl)-(p-cyclohexanolyl)-ethane having an androgenic activity of about 1 capon unit for each mg.

2. The compound

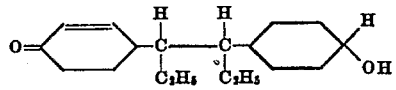

WALTER SCHOELLER.
HANS HERLOFF INHOFFEN.
KONRAD STEINRUCK.
OTTO HÖSS.